United States Patent [19]
Vosteen

[11] 3,921,087
[45] Nov. 18, 1975

[54] ELECTROSTATIC FIELD MODULATOR HAVING A TUNING FORK

[76] Inventor: Robert E. Vosteen, 315 W. Center St., Medina, N.Y. 14103

[22] Filed: May 12, 1971

[21] Appl. No.: 142,801

Related U.S. Application Data
[63] Continuation of Ser. No. 767,147, Oct. 14, 1969, abandoned.

[52] U.S. Cl. .................. 330/2; 330/10; 324/79; 331/156
[51] Int. Cl.² .................................. G01R 19/00
[58] Field of Search .............. 332/2; 330/60, 65, 10, 330/2; 329/153, 199; 331/156; 324/79 X, 61 C; 178/6

[56]  References Cited
UNITED STATES PATENTS

| | | | |
|---|---|---|---|
| 2,047,817 | 7/1936 | Bailey | 178/6 |
| 2,148,628 | 2/1939 | Blau et al. | 324/79 X |
| 2,562,640 | 7/1951 | Reason | 332/2 |
| 3,265,992 | 8/1966 | Pleasure | 331/156 |
| 3,379,972 | 4/1968 | Foster et al. | 324/61 |

*Primary Examiner*—Nathan Kaufman
*Attorney, Agent, or Firm*—Albert J. Santorelli

[57] ABSTRACT

A capacitive electrostatic modulator having a tuning fork arrangement including tines operatively associated with each end of the tuning fork. A driver is used to vibrate the tuning fork to alternately couple and decouple a sensitive electrode with the unknown quantity being measured such that a voltage corresponding to the unknown quantity is induced thereon. Associated circuitry enables connection of the electrostatic modulator as an electrostatic voltmeter or field meter.

21 Claims, 7 Drawing Figures

INVENTOR
ROBERT E. VOSTEEN

ATTORNEYS

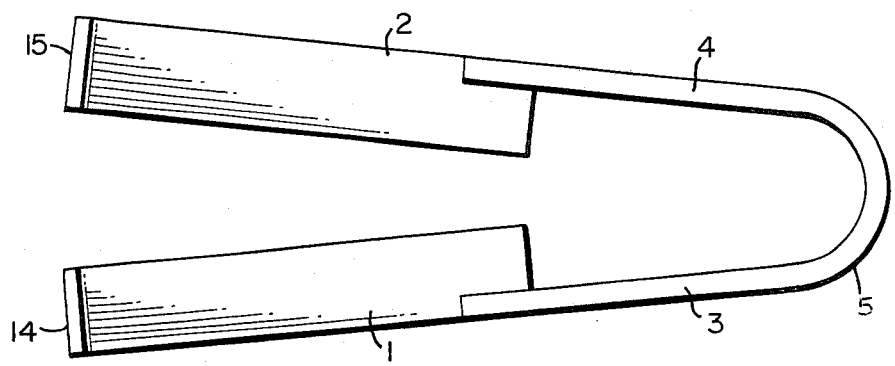
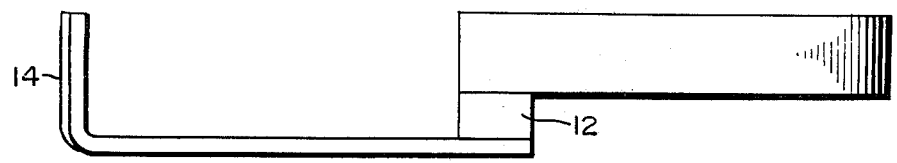
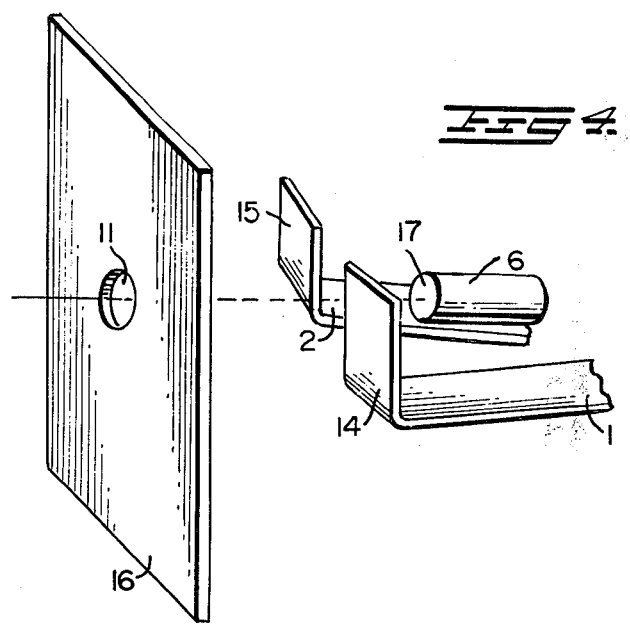

ELECTROSTATIC FIELD MODULATOR HAVING A TUNING FORK

This application is a continuation of application Ser. No. 767,147, filed Oct. 14, 1969, and now abandoned.

BACKGROUND OF THE INVENTION

1. Field of the Invention:

The invention concerns a capacitive electrostatic modulator utilizing a tuning fork arrangement with associated tines. It has particular utility, in conjunction with associated circuitry, as an electrostatic voltmeter or field meter.

2. Description of the Prior Art:

Electrostatic modulators and associated circuitry to produce non-contacting DC electrostatic instruments and systems for us as electrostatic voltmeters, field meters, coulometers and charge control systems are known in the prior art. One such type of electrostatic modulator comprises a rotating metallic disc defining a plurality of perforations interposed between the unknown quantity being measured and a sensitive electrode, to thereby couple the latter alternately to the unknown quantity and the rotating disc. This causes an AC voltage proportional to the difference in DC voltage between the unknown quantity and the disc to be induced on the sensitive electrode. This technique does provide high modulation efficiency and high potential modulation frequency. However it also has several disadvantages in that it has poor electrical efficiency because it requires a high power input. Further it results in high noise generation because of the bearing and slip ring/brush noise, in addition to producing a random noise spectrum that is difficult to minimize.

Another type of prior art electrostatic modulator is the vibrating capacitor modulator. This involves the utilization of a sensitive electrode coupled mechanically to a driver such as a conventional PM dynamic transducer. The sensitive electrode is placed in the unknown electrostatic field and an AC voltage is induced on it which is proportional to the ambient field being measured and the peak-to-peak mechanical displacement. Such apparatus does provide certain advantages in that it is relatively inexpensive to manufacture, and unwanted noise is typically sinusoidal at the carrier frequency applied to the transducer thereby enabling it to be balanced out by suitable techniques known in the art. However it also provides certain disadvantages in that it has poor modulation efficiency and relatively poor sensitivity, thereby providing correspondingly poor resolution capability.

SUMMARY OF THE INVENTION

The invention concerns a capacitive modulator having a tuning fork configuration with associated tines connected to each end of the tuning fork. The tines are interposed between a sensitive electrode and the quantity being measured. Drive means are operatively associated with the tuning fork which function to cause oscillation of the tines in opposite phase at equal amplitude to vary the coupling relationship between the sensitive electrode and the unknown quantity being measured, to thereby induce on the sensitive electrode a corresponding voltage which may be processed to provide a measurement of the unknown quantity being measured.

A housing is associated with the probe assembly defining a bottom plate having an aperture. The sensitive electrode looks at the unknown quantity being measured, which may be inter alia an electrostatic potential of a surface or an electrostatic field, through the aperture, with the tines alternately coupling and decoupling the sensitive electrode to the unknown quantity being measured.

Associated circuitry comprising a preamplifier and signal amplifier are connected to the sensitive electrode to obtain desired amplification of the signal induced thereon. The tuning fork is driven by an electromechanical driver connected to a reference oscillator, and thereby detector signals induced on the sensitive electrode as a result of coupling to the unknown quantity being measured are modulated at the frequency of the reference oscillator. Additionally, the reference oscillator supplies signals to a phase sensitive detector which also receives the output of the signal amplifier to cause demodulation of the modulated detector signals induced on the sensitive electrode. An integrating amplifier is connected to the output of the phase sensitive detector to amplify the output thereof and a voltage indicator is connected to the output of the operational amplifier to provide measurement of the unknown quantity under test.

The described tuning fork arrangement functioning as a capacitive detector in conjunction with the sensitive electrode is particularly advantageous over the prior art because of its:

1. Small physical size
2. Low electrical noise
3. Low acoustical noise
4. High modulation efficiency
5. Low electrical power consumption
6. High surface resolution
7. Low drift
8. High reliability
9. Long life
10. High resistance to probe contamination
11. Low voltage operation
12. Excellent immunity to hazardous spark generation

BRIEF DESCRIPTION OF THE DRAWINGS

FIGS. 3a and 3b are plan and front views respectively of the preferred tine arrangement;

FIG. 4 is an isometric view of the tine arrangement shown in FIG. 3 interposed between the sensitive electrode and the aperture defined by the probe assembly end plate;

DETAILED DESCRIPTION OF THE INVENTION

Figure 1:
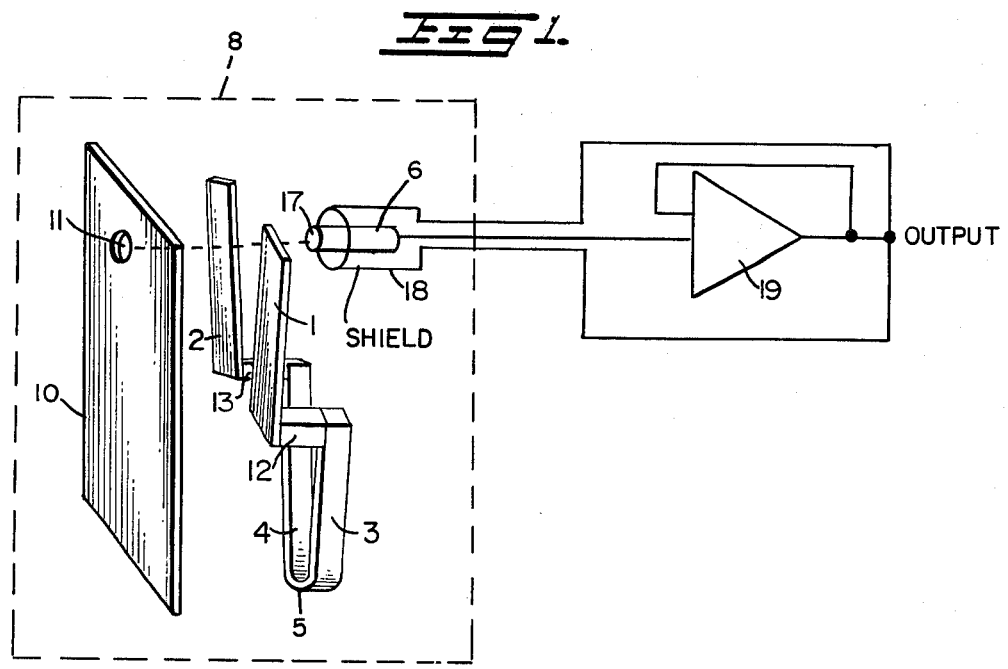
FIG. 1 is a perspective view of the tuning fork and associated tine assembly comprising the capacitor detector in conjunction with the sensitive electrode.
Figure 5:
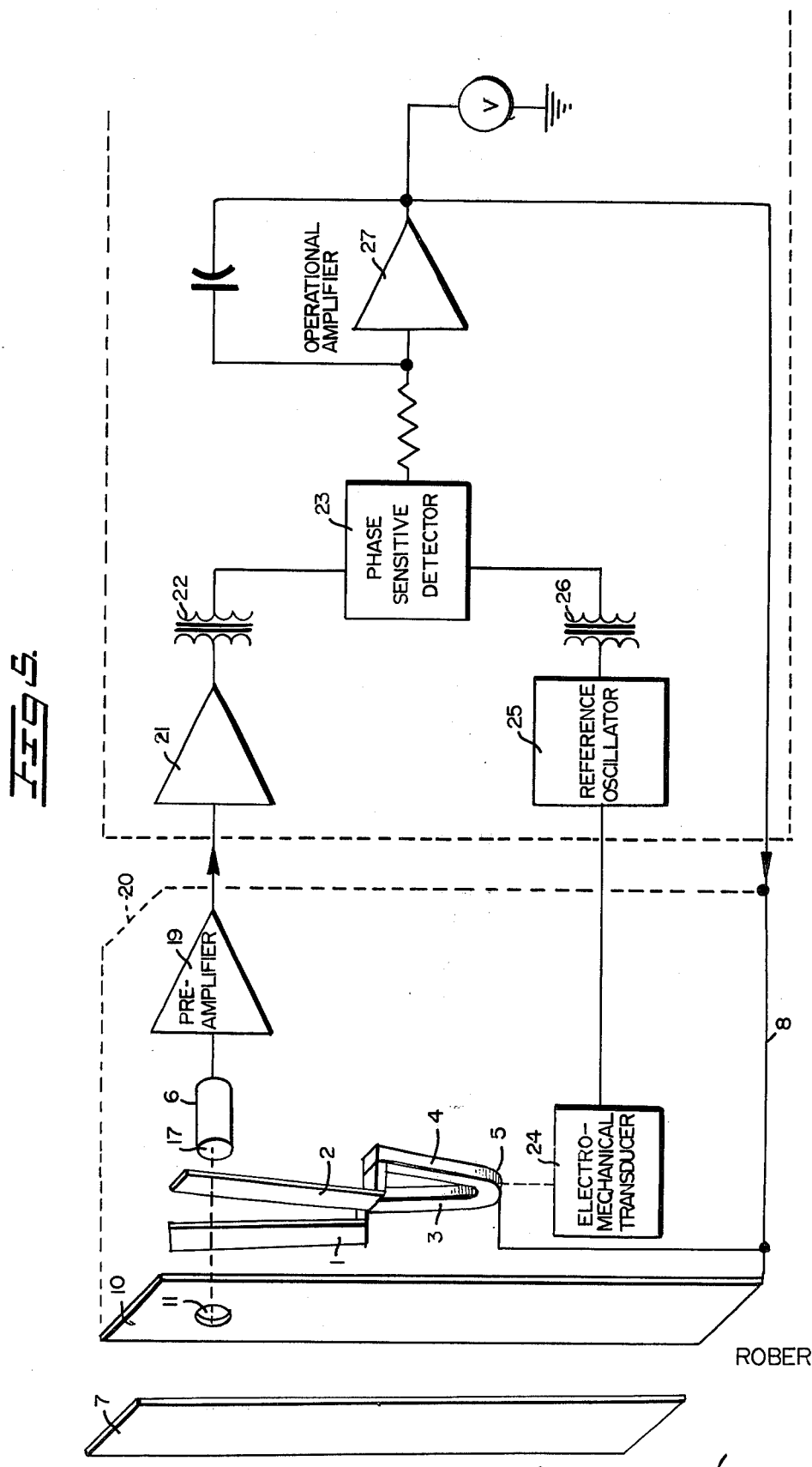
FIG. 5 is a block diagram showing how the capacitor detector comprising the tuning fork arrangement with tines functions with associated circuitry as an electrostatic voltmeter.

The electrostatic modulator according to the invention comprises a pair of thin vibrating tines 1 and 2 affixed to ends 3 and 4 respectively of tuning fork 5, as shown in FIGS. 1 and 5. The tines are caused to vibrate in a plane perpendicular to their thinnest dimension and are interposed between sensitive electrode 6 and either the surface or within the electrostatic field under test.

With relation to FIG. 5, surface 7 is shown and it may be assumed that it is desired to measure the surface potential thereof without actual contact between probe assembly 8 and surface 7. Vibrating tines 1 and 2 are shown interposed between surface 7 and sensitive electrode 6.

Figure 2A:
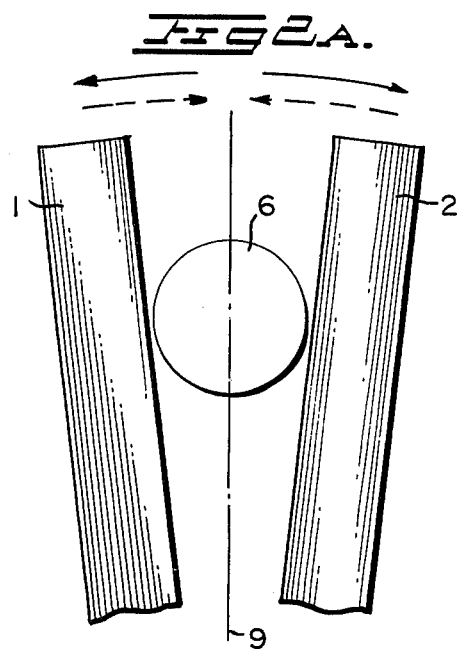
FIGS. 2a and 2b are views of the tines showing their maximum and minimum relative displacement respectively.
Figure 2B:
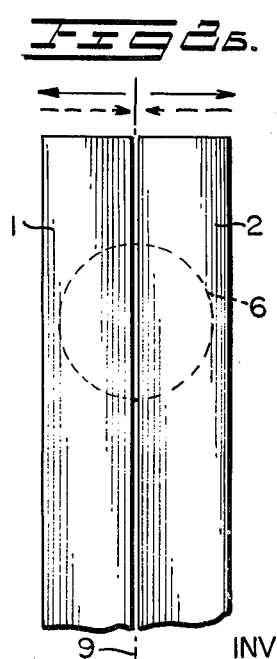

The movement of complimentary tines 1 and 2 may be explained with reference to FIG 2. FIG. 2a shows the extreme position of tines 1 and 2 with respect to the relative displacement therebetween, looking from surface 7 under test. When the tines are displaced from one another, surface 7 (or if an electrostatic field is being measured, the field) is exposed to sensitive electrode 6. On the other hand, FIG. 2b shows the position of tines 1 and 2 at their minimum degree of relative displacement. At this time, tines 1 and 2 are just short of touching and effectively block sensitive electrode 6 from the surface 7.

Tines 1 and 2 oscillate in opposite phase with respect to center line 9. That is, the tines move away from and towards center line 9 simultaneously in response to vibration of tuning fork 5. This shown in FIG. 2a and 2b wherein the solid line arrows associated with the tines illustrate their simultaneous movement away from center line 9, and the dotted line arrows illustrate their simultaneous movement towards center line 9.

The tines thereby alternately couple sensitive electrode 6 to surface 7 in the position shown in FIG. 2a, and block or decouple sensitive electrode 6 from surface 7 in the position shown in FIG. 2b. In response to the described oscillation of tines 1 and 2, an AC voltage proportional to the difference in the electrostatic field set up by the unknown quantity and the tines is induced on sensitive electrode 6.

The tines preferably comprise high Q mechanical resonant beams. If the tines are caused to oscillate at their own natural resonant frequency by driving them from an electrical source having positive feedback derived from the resonant beam motion, it is possible to obtain a given amplitude of beam motion with a minimum amount of driving power. This functions to not only minimize the driving power requirements but also to minimize the possibility of generating hazardous sparks resulting from circuit interruptions because the peak energy requirements are correspondingly minimized.

The tuning fork assembly shown is particularly advantageous because its associated tines produce displacement excursions which are equal in amplitude and opposite in phase. A displacement node therefore exists at the mount of the tuning fork resulting in the extraction of minimum vibrational energy from the system at this point. This is particularly advantageous relative to the use of a single vibrating beam which is adversely influenced by the nature of its mount. In using a cantileved beam, unless a mount of infinite or very large mass is involved, vibrator energy would be coupled from the vibrating beam to the mount thereby reducing the system Q. The described tuning fork assembly on the other hand provides a balanced system which inherently couples little energy to its mount. Thus the mass of a mount associated with use of the tuning fork assembly described becomes non-critical and the probe structure holding the tuning fork may in turn be suspended or attached to a mount of any mass without influencing the performance of the tuning fork.

As shown in FIGS. 1 and 3, tines 1 and 2 are respectively mounted in offset manner to ends 3 and 4 of tuning fork 5 by mounts 12 and 13 respectively. Such offset mounting minimizes bottom plate - to - tine spacing.

In order to minimize fringing electrostatic fields and maximize coupling to the desired source, it is desirable to minimize the thickness of bottom plate 10 and tines 1 and 2, and the spacing between aperture 11 and the tines, and sensitive electrode 6 and the tines. The embodiment of the invention shown in FIG. 5 is an exploded view of the probe assembly, with practical dimensions of bottom plate - to - tine spacing, tine thickness, and tine - to - sensitive electrode spacing being approximately 0.005 inch. Aperture 11 would have a diameter within the range 0.020 inch to 0.070 inch. The above dimensions could be further reduced by using other design and assembly features.

A bottom plate is not essential to functioning of the probe, and in fact, the use of bottom plate 10 which defines aperture 11 of limited size deteriorates the performance of the system by increasing the system noise which appears when the system gain must be increased to compensate for the electrostatic field attenuation created by the presence of the bottom plate. However bottom plate 10 must necessarily be used because its functions as follows:

1. It restricts the "field of view" of the probe to thereby significantly improve the surface resolution of the latter.

2. It protects the fragile vibrating tines affixed to the tuning fork from inadvertent physical contact with outside elements 3. It restricts flow of air into the probe thereby minimizing the possibility of probe contamination resulting from foreign matter that might be present in the air.

The tines may be constructed to form right angle flanges at their free ends. Thus right angle sections 14 and 15 are respectively defined by tines 1 and 2. The purpose of providing the right angle sections is to maximize utilization of the probe assembly.

For example in FIG. 1 tines 1 and 2 are shown as not comprising the above described right angle sections. The tines are located between bottom plate 10 and sensitive electrode 6. However by providing the tines with right angle sections 14 and 15, as shown in FIG. 4, end plate 16 of the probe assembly provided with sensitive aperture 11 may be used to effect coupling to the unknown quantity being measured. Thus in FIG. 4 right angle sections 14 and 15 are interposed between aperture 11 of end plate 16 and sensitive electrode 6. The connection of the tines shown in FIG. 4 to respective ends of tuning fork 5 is similar to that shown in FIG. 1, and is therefore not illustrated.

Therefore both bottom plate viewing and/or end plate viewing of the unknown quantity being measured may be provided, depending upon the probe assembly tine configuration. The configuration of the tines shown in FIG 3 wherein right angle sections are formed at their ends is particularly advantageous because it enables use of the probe assembly as both a bottom plate viewing probe or an end plate viewing probe.

The sensitive electrode 6 illustrated is cylindrical and its only useful surface is bottom circular surface 17 which views the unknown quantity under test via the associated probe assembly aperture. If the remaining portion of the sensitive electrode is not suitably shielded, it would be subject to stray distributed capacitance from its surroundings which would cause the induced signal to be attenuated. Therefore in order to maximize the signal induced on sensitive electrode 6 all unused surfaces thereof and its connection to preamplifier 19 are shielded by shield 18, which is driven by the preamplifier output. Preamplifier 19 comprises a high input impedance preamplifier functioning as a precision voltage follower having a gain greater that +0.999. The effective stray distributed capacitance of the sensitive electrode is therefore reduced to a negligible value.

FIG. 5 shows the connection of the tuning fork configuration in a probe assembly having associated circuitry to function as a non-contacting DC electrostatic voltmeter. Probe assmebly 8 comprises integral housing 20 which contains the tuning fork configuration comprising tuning fork 4 and its associated connection by mounts 14 and 15 to tines 1 and 2, respectively, as well as sensitive electrode 6, preamplifier 19 and electromechanical transducer 24. Housing 20 comprises conductive material to provide an isolated environment for the probe assembly, in association with the feedback connection. The output of preamplifier 19 is connected to signal amplifier 21 which functions to amplify the output of the preamplifier. The output of the signal amplifier is connected by isolation transformer 22 to phase sensitive detector 23, which may be of the type described in applicant's copending applicaiton Ser. No. 567,973, filed on July 26, 1966.

Signals at a predetermined frequency are applied to electromechanical transducer 24 by reference oscillator 25 to vibrate tuning fork 5 and consequently tines 1 and 2 and cause detector signals generated by the capacitive detector to modulate a carrier frequency signal equal to the predetermined frequency. Reference oscillator 25 is also connected via isolation transformer 26 to phase sensitive detector 23 to enable detection of the modulated detector signal. Operational amplifier 27 which functions as an integrator is connected to the output of phase sensitive detector 23. Output indicator V is connected to the output of amplifier 27, and the output of the amplifier is also fed back to the frame of probe assembly 8.

Reference oscillator 25 functions to excite tuning fork 5 into oscillation at its resonant frequency. Although it is desirable that it provide sinusoidal waveforms, it is not essential. However the use of sinusoidal excitation waveforms permits the bucking out of any stray pickup inadvertently induced upon the preamplifier input due to the proximity of the tuning fork excitation voltage or current.

To achieve best performance it is desirable that preamplifier 19 have high input impedance compared to its source impedance. Since the source is capacitive in nature, the input capacitance of the preamplifier should be relatively small compared to the source capacitance, and the input resistance of the preamplifier should be relatively large compared to the source capacitance reactance at the tine resonant frequency. The described voltage follower preamplifier and its associated driven shield provides this capability. The preamplifier, as a voltage follower, has a relatively low output signal and consequently further voltage amplitude is provided by AC signal amplifier 21. The electronic circuitry described is powered from a single power supply (not shown) which is floated off ground.

The output of phase sensitive detector 23 is a DC voltage proportional to the peak AC voltage multiplied by the cosine of the phase angle between the signal and reference voltages. An important characteristic of the phase sensitive detector in this instance is good ripple filtering and minimum phase shift.

Amplifier 27 preferably comprises a high voltage integrating amplifier having high input impedance, an output voltage delivering capability in excess of ±2 KV, and an open loop gain of approximately $10 \times 10^6$.

The described feedback connection between the output of amplifier 27 and the frame of the probe converts the apparatus to a DC electrostatic voltmeter. The feedback polarity must be chosen such that the output of amplifier 27 is identical in polarity to that of the unknown quantity being measured. Then under such circumstances the output of amplifier 27 drives the preamplifier frame to a potential such that a null exists when the incident electric field is at a null. The electric field is nulled when the voltage difference is zero. The complete system therefore functions as a precision DC voltage follower which follows the DC voltage of the surface area under test.

The system of FIG. 5 operates in the following manner. Sensitive electrode 6 "looks" at surface 7 under measurement through small aperture 11 in bottom plate 10 of probe assembly 8. Sensitive electrode 6 and aperture 11 are axially aligned. Bottom plate 10 and aperture 11 restrict the "view" of the probe to a limited area on the surface under test thereby providing superior surface resolution. The chopped AC signal induced on this electrode is proportional to the differential voltage between the surface under measurement and the probe assembly. Its phase is dictated by the DC polarity.

The reference voltage from oscillator 25 and this mechanically modulated signal, conditioned by high input impedance preammplifier 19 and signal amplifier 21 are fed through isolation transformers to phase sensitive detector 23 whose output DC amplitude and polarity are dictated by the amplitude and phase of the electrostatically induced signal relative to the reference signal. The isolation transformers 22 and 26 are necessary since signal amplifier 21 and reference oscillator 25 operate off ground to follow the unknown potential and therefore can be at any DC potential in the range ±2000 volts. The output of the phase sensitive detector feeds high level DC integrating amplifier 27. Its output polarity is identical to that of the unknown. The output of this integrating amplifier is fed directly to the frame of the probe.

As the open loop gain from probe to integrator is extremely high (approximately $10^9$), the probe is driven to a DC voltage typically within 0.01% of the potential of the unknown for a one eighth inch probe-to-surface spacing. By simply metering the output of the DC integrating amplifier, one has an accurate indication of the unknown potential.

The described system could also function as an electrostatic fieldmeter if the bottom plate were isolated. Circuits of a preamplifier and system power supply that may be used in the system according to the invention are described in applicant's copending application filed Sept. 16, 1968 and entitled "Electrostatic Potential and Field Measurement Apparatus".

It is further desirable but not essential that a good amplitude stabilizing technique be employed to insure open loop gain stability, good conversion efficiency, good transient performance, and the avoidance of tine collision which is very deleterious to stable tine vibration. Tuning forks have been employed utilizing magnetic and piezoelectric transducers to both excite and detect tine motion. Both techniques are usable, separately or in combination.

It will be evident that many minor changes may be made in the apparatus described herein, without departure from the scope of the invention. Accordingly, the invention is not to be considered limited by such description, but only by the scope of the appended claims.

I claim:

1. An electrostatic measuring apparatus to measure unknowns such as the electrostatic potential of a surface in non-contacting manner or an electrostatic field with a capacitive detector having a sensitive electrode positionable in electrostatic coupling relationship with the surface or in the electrostatic field to produce a detector signal representative of the magnitude and polarity of the unknown being measured comprising:
   a tuning fork with first and second tines mounted to respective ends thereof, operatively postioned to be able to vary the coupling relationship,
   drive means to vibrate the tuning fork at a predetermined frequency to vary the coupling relationship and produce modulated detector signals having a carrier frequency equal to the predetermined frequency,
   a reference oscillator to produce reference signals at the predetermined frequency,
   a detector connected to receive the reference signals and modulated detector signals at a fixed phase relationship to demodulate the latter and produce an output signal indicative of the magnitude and polarity of the unknown being measured.

2. The electrostatic measuring apparatus recited in claim 1 wherein the first and second tines are interposed between the sensitive electrode and the unknown quantity being measured and are caused to oscillate in opposite phase at equal amplitude by the tuning fork to alternately couple and decouple the sensitive electrode from the unknown quantity being measured.

3. The electrostatic measuring apparatus recited in claim 2 further comprising:
   a housing, the assembly and the sensitive electrode being mounted therein, the housing having a plate defining an aperture located opposite a surface of the sensitive electrode.

4. The electrostatic measuring apparatus recited in claim 3 wherein the first and second tines are interposed between the aperture and the sensitive electrode.

5. The electrostatic measuring apparatus recited in claim 4 further comprising:
   first and second mounting means to mount the first and second tines to their respective ends of the tuning fork in offset manner to minimize the plate-to-sensitive electrode spacing.

6. The electrostatic measuring apparatus recited in claim 3 wherein the first and second tines each define right angle sections at their free ends.

7. The electrostatic measuring apparatus recited in claim 6 wherein the right angle sections are interposed between the aperture and the sensitive electrode.

8. The electrostatic measuring apparatus recited in claim 1 further comprising:
   a preamplifier interposed between the capacitive detector and the detector.

9. The electrostatic measuring apparatus recited in claim 8 wherein the sensitive electrode is connected to the preamplifier input.

10. The electrostatic measuring apparatus recited in claim 1 wherein the reference oscillator is connected to the drive means to apply reference signals thereto at the predetermined frequency.

11. The electrostatic measuring apparatus recited in claim 8 further comprising:
    a compact probe housing containing the preamplifier, capacitive detector, and the drive means,
    shield means to shield the capacitive detector from stray capacitive effects.

12. An electrostatic measuring apparatus recited in claim 1 further comprising a high gain operational amplifier connected to the output of the detector.

13. The electrostatic measuring apparatus recited in claim 12 for measurement of the electro static potential of a surface further comprising:
    a housing of conductive material, said capacitive detector being mounted in the housing which provides a substantially isolated environment therefor,
    a feedback circuit connected between the output of the operational amplifier and the housing to drive the latter and the sensitive electrode very close to the electrostatic potential being measured to create a substantially zero field condition which does not disturb the electrostatic charge distribution of the surface to produce an accurate replica of the electrostatic potential under measurement.

14. The electrostatic measuring apparatus recited in claim 13 wherein the housing comprises a bottom plate defining an aperture located opposite the sensitive electrode.

15. In a capacitive modulator having a tuning fork with drive means to vibrate the tuning fork at a predetermined frequency and a sensitive electrode subject to capacitive coupling, the improvement comprising:
    a tuning fork having first and second ends,
    first and second mounting means respectively mounted in offset manner to the first and second ends,
    first and second tines respectively attached to the first and second mounting means extending therefrom in substantially opposite direction relative respectively to the first and second ends, operative to vary the coupling relationship to which the sensitive electrode is subject and produce modulated signals at the sensitive electrode having a carrier frequency equal to the predetermined frequency.

16. In the capacitive modulator recited in claim 15, wherein the first and second tines are caused to oscillate in opposite phase at equal amplitude by the tuning fork to alternately couple and decouple the sensitive electrode which is subject to capacitive coupling.

17. In the capacitive modulator recited in claim 16, a housing, the sensitive electrode being mounted therein, the housing having a plate defining an aperture located opposite the surface of the sensitive electrode.

18. In the capacitive modulator recited inclaim 17, wherein the first and second tines are interposed between the aperture and the sensitive electrode.

19. In the capacitive modulator recited in claim 18, wherein the first and second mounting means are operative to minimize the plate-to-sensitive electrode spacing.

20. In the capacitive modulator recited in claim 17, wherein the first and second tines define right angle sections at their free ends.

21. In the capacitive modulator recited in claim 20, wherein the right angle sections are interposed between the aperture and the sensitive electrode.

\* \* \* \* \*